March 28, 1950 V. VAN MILLINGEN 2,501,975
LANDING NET
Filed July 28, 1948
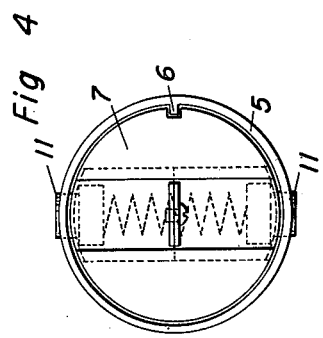
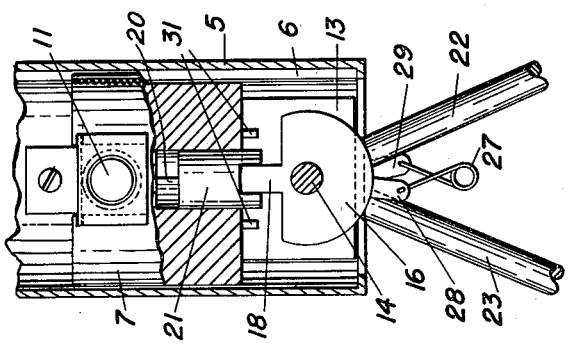
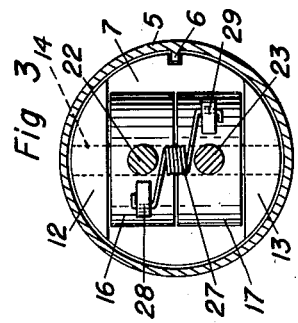
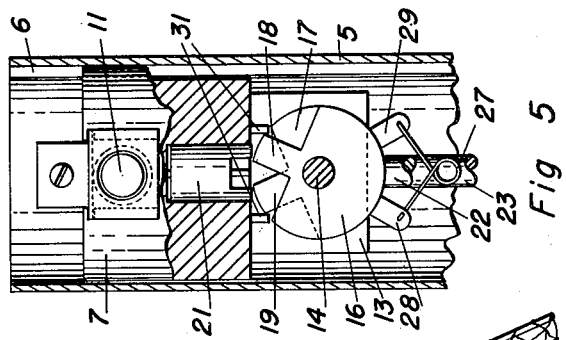
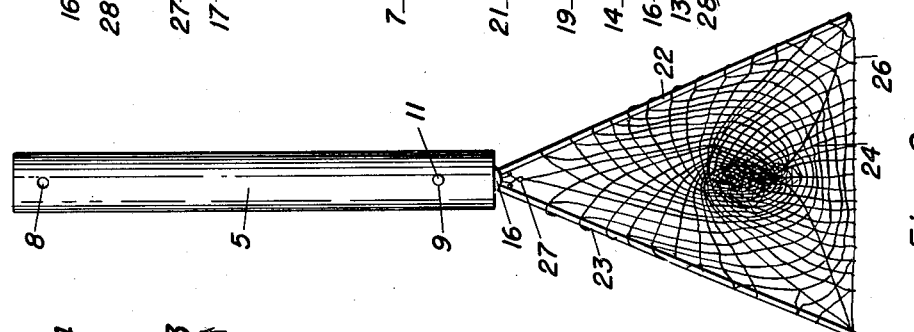
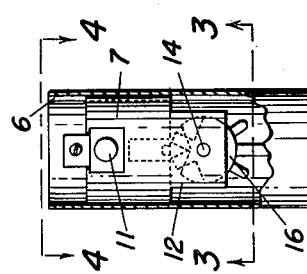
INVENTOR.
Vivian Van Millingen
BY
Att'y Patented Mar. 28, 1950

2,501,975

UNITED STATES PATENT OFFICE 2,501,975

LANDING NET

Vivian van Millingen, San Francisco, Calif.

Application July 28, 1948, Serial No. 41,030

3 Claims. (Cl. 43—12)

This invention relates to improvements in fishing nets and has particular reference to a landing net.

The principal object of this invention is to produce a landing net which is light in construction, easy to use, and one which may be moved into open position with the use of but one hand.

A further object is to provide a net which is economical to manufacture, one which is completely protected when not in use against snagging on other objects, and a net which will be dried out even when in storage.

A further object is to provide means for automatically spreading the net from closed to open position as soon as the net-holding arms are released from the housing structure.

Other objects and advantages will be apparent during the course of the following description.

In the accompanying drawings forming a part of this specification and in which like numerals are employed to designate like parts throughout the same, Fig. 1 is a side elevation of my landing net showing a portion thereof broken away and showing parts in closed position, Fig. 2 is a similar view on a reduced scale and showing the parts in open position and ready for use, Fig. 3 is an enlarged cross-sectional view taken on the line 3—3 of Fig. 1, Fig. 4 is a similar view, taken on the line 4—4 of Fig. 1, Fig. 5 is an enlarged fragmentary detail view, partly in cross section, showing the net carrier in its upper or closed position, and Fig. 6 is an enlarged fragmentary detail view, showing the carrier in its lowered or open position.

In the sport of fishing, many fishermen employ a dip net for the purpose of lifting a fish out of the water, thus eliminating, to a large extent, the possibility of losing the fish, which often occurs when the fish is free to flop in the air after being lifted out of the water, as the hook often tears out of the mouth during the free movement of the fish. As the fisherman, at this time, is very busy manipulating the pole, the line and the reel, both hands are occupied until the fish is adjacent the fisherman and it is at this time that a net should be used. The fisherman now manipulates the pole with one hand, holding down on the reel to prevent running out of the line, while the other hand is employed for the netting purpose. This pressure is also described in my copending application, Serial No. 33,299, filed June 16, 1948, now abandoned.

It is often very difficult to land a fish and, therefore, a net which can be manipulated with one hand while the fisherman holds the rod with the other hand, is a very useful piece of equipment. These nets, heretofore, have usually consisted of a handle and a rod having a loop, from which loop the net is hung. This type of net is awkward to carry and often becomes entangled in brush which may be adjacent the fishing area.

Applicant has, therefore, devised a landing net wherein the net and the supporting members therefor are entirely enclosed in a hollow, open-ended tube and in such a manner that they may be quickly released so as to be projected from the tube, ready for use.

Referring to the drawings the numeral 5 designates a tube-like housing which is open at both ends and is provided with a track 6, which serves to guide a slotted weighted slider 7, and to thus prevent rotation of the carrier in the tube 5.

Formed in the sides of the housing are opposed openings 8 and 9, which serve to hold the slider in upper or lower position through the medium of spring-pressed detents 11, which project through the openings 8 or 9, as the case may be.

The bottom of the slider is slotted so as to form side wings 12 and 13, which wings support a cross shaft 14, upon which is mounted a pair of free rotatable arm-carrying members 16 and 17. Each one of these members 16 and 17, has an upstanding lug, as shown at 18 and 19 respectively which, when in alignment, are adapted to be engaged by the forked end of a sliding detent 21 mounted in the slider 7.

Arms, 22 and 23, are attached to the arm-carrying members 16 and 17 respectively, and serve to support a portion of the net 24 thereon, and also have attached to their free ends a limiting spreader 26, which spreader is also attached to the net.

A spring 27, has its arm-engaging lugs 28 and 29, secured to the arm-carrying members 16 and 17 respectively.

It is obvious that the detent 21, may be prevented from rotating in any desired manner, as by a key as shown at 20.

Limiting stops 31, prevent the arms from being opened in the wrong direction.

The result of this construction is that, when the weighted slider 7, is in the upper portion of the tube-like housing, the net will be encased within the housing, as shown in Fig. 1, and the detents 11, will be projected through the openings 8, as indicated in Fig. 4.

Assuming now, that it is desired to use the net (and it may be here mentioned that the tube is usually hung on the person through the use of a hook or clip arrangement) the user lifts the tube off of the hook or out of the clip and presses with the thumb and first finger the spring-pressed detents 11, which releases the slider 7, so that it may move downwardly from the position shown in Fig. 1, to that shown in Fig. 2, which act projects the arms 22 and 23, together with the supported net, out of the tube and, at the same time, the detents 11, are guided into the openings 9, through the fact that the slider is held in the correct position by the track 6, with which it slidably engages.

As soon as the arms 22 and 23, have moved out of the tube, the spring 27, will function to exert pressure on the lugs 28 and 29, thus revolving the arm-carrying members 16 and 17, from their position of Fig. 5 to that of Fig. 6, with the lugs 18 and 19, in alignment with each other, at which time the forked end of the sliding detent 21 will drop through gravity and hold the two arms in spread position.

When it is desired to return the net into the tube, it is merely necessary to turn the tube upside down so that the sliding detent 21, will return to the position of Fig. 5, after which the lugs 18 and 19, will be free and, consequently, the arm-carrying members, together with the arms, may be moved into parallel alignment, after which the arms, together with the net, may be telescoped into the tube by releasing the detents 11, from their openings 9, at the lower end of the tube and causing the detents to again engage the openings 8, at the top of the tube.

It will thus be seen that by simply moving the slider downwardly through the tube, the net will be projected and spread ready for use, as above described.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

In case the spring 27 fails to spread the arms, the net may be spread by using a twisting motion that is, by slightly rotating the tube about its vertical axis the free ends of the arms will tend to spread, due to centrifugal action of the twisting of the tube, thus spreading the arms of the landing net.

Having thus described my invention, I claim:

1. A landing net comprising an open-ended tube and a weighted slider slidable in said tube and maintained at either end thereof by spring-pressed detents, a pair of arms pivotally carried by said slider and serving to support a net, spring means for spreading said arms when said arms are projected out of said tube, and a sliding detent carried by said slider for maintaining said arms in spread position while said tube is being held with the net directed downwardly out of said tube.

2. A landing net including an open-ended tube, a slider movable in said tube and adjustably held at either end of said tube by spring-pressed detents engaging openings at the opposite ends of said tube, a track formed in said tube to maintain said slider and its detents in alignment with the openings in said tube, a pair of arms pivotally supported in said slider, said arms serving to support a landing net therebetween, spring means interposed between said arms to spread said arms for the purpose of extending said net when said net and said arms are projected out of said tube, and a gravity-actuated detent for holding said arms in spread position when said net and said arms are directed downwardly with respect to said tube.

3. A landing net including an open-ended tube, a slider movable in said tube and adjustably held at either end of said tube by spring-pressed detents engaging openings at the opposite ends of said tube, a track formed in said tube to maintain said slider and its detents in alignment with the openings in said tube, a shaft carried by said slider, arm-carrying members pivotally supported on said shaft and arms secured to each of said members, lugs carried by each of said members and so arranged that said lugs will be in radial alignment with respect to said shaft when said arms are moved apart a pre-determined distance, a sliding detent carried by said slider adapted to engage said lugs when said lugs are in alignment, a net carried by said arms and serving to limit the spread of said arms and spring means interposed between said arms for moving said arms and their carrying members on said shaft into spread position, whereby said detent will engage said lugs when said detent is actuated by gravity toward said lugs.

VIVIAN VAN MILLINGEN.

REFERENCES CITED

The following references are of record in the file of this patent:

UNITED STATES PATENTS

| Number | Name | Date |
| --- | --- | --- |
| 440,568 | Hebard | Nov. 11, 1890 |
| 985,114 | Covell | Feb. 21, 1911 |
| 1,077,481 | Levy | Nov. 4, 1913 |
| 1,957,944 | Dexter | May 8, 1934 |